United States Patent [19]

Yoshida et al.

[11] 3,839,113

[45] Oct. 1, 1974

[54] METHOD FOR MANUFACTURING THIN PLATE GLASS

[75] Inventors: Takeo Yoshida; Masaharu Koyama, both of Mobara, Japan

[73] Assignee: Hitachi, Ltd., Tokyo, Japan

[22] Filed: Apr. 18, 1973

[21] Appl. No.: 352,501

[30] Foreign Application Priority Data
Apr. 21, 1974 Japan.............................. 47-39618

[52] U.S. Cl............................... 156/24, 252/79.3
[51] Int. Cl............................................ C03c 15/00
[58] Field of Search ............... 156/24, 25, 15, 345; 65/31; 252/79.2, 79.3

[56] References Cited
UNITED STATES PATENTS 1,166,378  12/1915  Levy .................................. 156/8 X
2,999,013  9/1961  Meth ..................................... 156/6
3,711,263  1/1973  Leger ..................................... 65/31

Primary Examiner—William A. Powell
Attorney, Agent, or Firm—Craig and Antonelli

[57] ABSTRACT

A method of manufacturing a thin plate glass by chemical etching, wherein a chemical etching solution is sprayed from a sprayer onto the surface of a thick plate glass held substantially in a vertical position, and said thick plate glass and said sprayer are caused to make a relative movement during the operation of spray, whereby the etching solution is sprayed substantially uniformly to the surface of the thick plate glass.

8 Claims, No Drawings

METHOD FOR MANUFACTURING THIN PLATE GLASS

In recent years, means applying electronic techniques, e.g., plasma and liquid crystals, have been utilized in various display devices. In such display devices, plate glasses having various characteristics are used as the main constituent elements of the devices. In order to impart the desired electrical characteristics to these plate glasses, it is essential to use especially a plate glass having a very small thickness, e.g., a thin plate glass having a thickness of about 0.1 – 0.7 mm.

For the manufacture of such a plate glass having a thickness of about 0.1 – 0.7 mm (hereinafter referred to as thin plate glass), there have been known a method in which a thin plate glass having the desired thickness is manufactured by grinding mechanically one or both surfaces of a thick plate glass having a thickness of 1.3 mm or larger, usually about 2.0 mm, and a method in which a plate glass is lifted from a molten glass pool or is subjected to etching, as in the ordinary plate glass manufacturing method.

In the manufacture of a thin plate glass having a thickness of about 0.1 – 0.7 mm, it is time-saving to use, as the starting material, a plate glass whose thickness is close to the desired thickness. In the mechanical grinding method, however, it has been conventional to use a plate glass of a thickness of about 2.0 mm, to be ground and finished by a grinding machine. Therefore, the resulting thin plate glass is limited in size by the size of the grinding machine used, and a thin plate glass of very small dimensions, say about 150 mm × 150 mm, can only be obtained. Further, the ginding operation requires high skill and much time as long as several hours, which necessarily add to the cost of manufacture. There has been the additional disadvantage that the mechanical strength of the finished thin plate glass is degraded substantially by fine flaws resulting from grinding operation.

On the other hand, the method of manufacturing a thin plate glass by lifting a molten glass is being employed in the manufacture of limited types of special glasses, but not being practiced generally widely, because the manufacturing procedures are adapted for mass production and much inconvenience is encountered in the operation of the manufacturing procedures for manufacturing a thin plate glass in a small scale.

Besides the methods described above, there has been known another method in which a thin plate glass is manufactured from a thick plate glass previously manufactured in a large quantity, by etching the surface of the thick plate glass as by dipping said plate glass in an etching solution comprising, as its main component, hydrogen fluoride which has a glass etching property. In order to obtain a thin plate glass having a transparent and flat finished surface by this method, the etching solution used must have a special etching stabilizer incorporated therein. It has been extremely difficult, however, to obtain by this method a uniformly etched glossy surface of a large area having the desired high degree of transparency and high degree of flatness, since etching of the glass surface in the etching operation is prevented locally by the fluoride compounds insoluble in the etching solution which deposit on the glass surface.

It is, therefore, an object of the present invention to provide a method which obviates the above-described disadvantages of the prior art methods and by which a thin plate glass having the desired characteristics can be manufactured relatively easily from ordinary commercial plate glasses.

Another object of the invention is to provide a method by which a thin plate glass having a uniform thickness and a glossy surface and having a uniform thickness and a large area can be manufactured easily by using an ordinary etching solution not incorporating any special additives therein.

A further object of the invention is to provide a method by which a thin plate glass which is stronger in strength than those obtained by the mechanical grinding method can be manufactured easily in a short period of time.

In the method of this invention, use is made, as the starting material, a plate glass such as a soda lime glass commercially being sold on the market, and the plate glass is etched from one or both surfaces by using a chemical etching solution containing hydrofluoric acid, hydrochloric acid and sulfuric acid, to obtain a thin plate glass. The starting plate glass is held in a substantially vertical position so as to allow the insoluble reaction products, which deposit on the surface or surfaces of the plate glass, to move away from said surface or surfaces in the shortest possible time, and the etching solution is sprayed by a sprayer onto one or both surfaces of the plate glass to carry out etching. The sprayer and the plate glass are caused to make a relative movement while the etching solution is being sprayed, so as to minimize the unevenness in the degree of etching over the surface or surfaces of the plate glass. Practically speaking, the plate glass is constantly rotated in the plane in which it lies, or a nozzle of the sprayer is constantly displaced, or the plate glass is rotated and the nozzle is displaced concurrently, so that the etching solution may be sprayed uniformly over the entire area of the plate glass surface and said plate glass surface may be etched uniformly by the etching solution.

Such relative movement can be effected easily either manually or mechanically automatically.

The hydrochloric acid and sulfuric acid added to the hydrofluoric acid serve to convert the fluorides, formed during the etching operation and being insoluble in fluoric acid and water, into chlorides and sulfides which are soluble on softening in water, and facilitate the removal of said fluorides from the glass surface and thereby minimize the amounts of the fluorides attaching to the walls of the etching apparatus, etc. Consequently, troubles otherwise encountered in the thin plate glass manufacturing operation due to the attachment of the deposited fluorides can be eliminated and a uniform etched surface of the plate glass can be obtained.

In the experiment conducted by the present inventor, a commercial soda-lime plate glass (1.3 mm in thickness) was held in a vertical position and rotated in the plane in which said plate glass lied, and an etching solution consisting of about 20 percent of hydrofluoric acid, about 15 percent of hydrochloric acid, about 2 percent of sulfuric acid and the balance of water was sprayed onto both surfaces of the plate glass by a sprayer, whereby a thin plate glass having a size of 450 mm × 450 mm and a thickness of 0.3 mm was obtained in such a very short period of time as about 8 minutes. The composition of the etching solution mentioned above is optimum for the small scale manufacture of the thin plate glass, in respect of the manufacturing time and glossiness of the finished surface aimed by the present invention.

An etching solution consisting of about 15 – 25 percent of hydrofluoric acid, about 15 – 25 percent of hydrochloric acid, about 1 – 4 percent of sulfuric acid and the balance of water can also be used satisfactorily to obtain the desired glossy etched surface, although a longer time is required and more amounts of difficult-soluble deposit than in the example described above.

It was found through experiment that, in view of the small scale manufacture of thin plate glasses, the critical composition of the etching solution usable in the present invention is about 10 – 35 percent of hydrofluoric acid, about 10 – 35 percent of hydrochloric acid, about 0.1 – 10 percent of sulfuric acid and the balance of water.

In the example described above, a thin plate glass having a thickness of 0.3 mm was obtained, but it should be understood that the thickness of the product thin plate glass can be varied optionally by controlling the period of etching operation.

As may be understood from the foregoing description, according to the method of this invention it is possible to use commercial plate glasses as the starting material for manufacturing a thin plate glass and to obtain easily even thin plate glasses having specific dimensions in small quantities. The method of the invention can be operated with no quantitative limitation on the product thin plate glasses and without resulting in the strength reduction of the product thin plate glasses, which has been encountered in the conventional mechanical grinding method. In the method of the invention, the surface flaws initially present on the surface of the starting material are rather diminished by the etching of the surface layer of said material and a thin plate glass having a relatively large strength can be obtained. Further, the method of the invention does not call for a special etching solution as has been used in the conventional dip-etching method, and the etching of the starting plate glass can be achieved with etching solutions easy to procure, e.g., those comprising hydrofluoric acid, hydrochloric acid and sulfuric acid. It is also to be noted that according to the method of this invention thin plate glasses can be obtained easily which are much larger in size than those obtainable by the conventional methods and lend themselves well to use for industrial applications for which various sizes of thin plate glasses are required. Thus, the present invention has enabled thin plate glasses to be obtained with ease which have not been obtainable heretofore.

What is claimed is:

1. A method for manufacturing a thin plate glass by chemical etching, comprising the step of holding a starting plate glass in a substantially vertical position, the step of spraying a chemical etching solution by a sprayer onto at least one surface of said starting plate glass, and the step of causing said starting plate glass and sprayer to make a relative movement while said chemical etching solution is being sprayed thereby to make uniform the degree of etching over the entire area of said surface.

2. A method of manufacturing a thin plate glass, as claimed in claim 1, wherein said chemical etching solution consists of 10 – 35 percent of hydrofluoric acid, 10 – 35 percent of hydrochloric acid, 0.1 – 10 percent of sulfuric acid and the balance of water.

3. A method of manufacturing a thin plate glass, as claimed in claim 1, wherein said chemical etching solution consists of 15 – 25 percent of hydrofluoric acid, 15 – 25 percent of hydrochloric acid, 1 – 4 percent of sulfuric acid and the balance of water.

4. A method of manufacturing a thin plate glass, as claimed in claim 1, wherein said chemical etching solution consists of about 20 percent of hydrofluoric acid, about 15 percent of hydrochloric acid, about 2 percent of sulfuric acid and the balance of water.

5. A method of manufacturing a thin plate glass, as claimed in claim 1, wherein the thickness of the thin plate glass is 0.1 – 0.7 mm.

6. A method of manufacturing a thin plate glass, as claimed in claim 1, wherein said relative movement is achieved by moving the starting plate glass.

7. A method of manufacturing a thin plate glass, as claimed in claim 1, wherein said relative movement is achieved by moving the sprayer.

8. A method of manufacturing a thin plate glass, as claimed in claim 1, wherein said relative movement is achieved by moving the starting plate glass and the sprayer.

* * * * *